(12) United States Patent
Masterson et al.

(10) Patent No.: US 8,439,669 B2
(45) Date of Patent: May 14, 2013

(54) INSECT REPELLANT TORCH

(75) Inventors: Daniel Masterson, Geneva, IL (US);
Richard Catalano, Hartland, WI (US);
Eric Snell, Meansville, GA (US)

(73) Assignee: Lamplight Farms Incorporated,
Menomonee Falls, WI (US)

( * ) Notice: Subject to any disclaimer, the term of this patent is extended or adjusted under 35 U.S.C. 154(b) by 326 days.

(21) Appl. No.: 12/945,416

(22) Filed: Nov. 12, 2010

(65) Prior Publication Data

US 2011/0139894 A1 Jun. 16, 2011

Related U.S. Application Data

(60) Provisional application No. 61/261,121, filed on Nov. 13, 2009.

(51) Int. Cl.
*F23D 3/02* (2006.01)
(52) U.S. Cl.
USPC ............ 431/298; 431/289; 431/344; 239/135
(58) Field of Classification Search .................. 431/298, 431/289, 344; 422/120, 123, 125, 126; 126/258, 126/255; 239/135, 136, 34; 362/159, 180
See application file for complete search history.

(56) References Cited

U.S. PATENT DOCUMENTS

| | | | |
|---|---|---|---|
| 4,892,711 | A | 1/1990 | Tendick, Sr. |
| 5,700,430 | A | 12/1997 | Bonnema et al. |
| 5,928,605 | A | 7/1999 | Bonnema et al. |
| 6,033,212 | A | 3/2000 | Bonnema et al. |
| 6,482,365 | B1 | 11/2002 | Soller |
| 6,503,459 | B1 | 1/2003 | Leonard et al. |
| 6,631,852 | B1 | 10/2003 | O'Leary |
| 6,663,838 | B1 | 12/2003 | Soller et al. |
| 6,709,666 | B2 | 3/2004 | Kishi et al. |
| 6,802,707 | B2 | 10/2004 | Furner et al. |
| 7,247,017 | B2 | 7/2007 | Furner |
| 2007/0242485 | A1 | 10/2007 | Chien |
| 2009/0293341 | A1 | 12/2009 | Fleming |
| 2009/0294553 | A1 | 12/2009 | Wang et al. |
| 2010/0053935 | A1 | 3/2010 | Shen |

FOREIGN PATENT DOCUMENTS

WO   WO2004023850   3/2004

*Primary Examiner* — Alfred Basichas
(74) *Attorney, Agent, or Firm* — Fellers, Snider, Blankenship, Bailey & Tippens, P.C.

(57) ABSTRACT

An insect repellant torch is disclosed. The torch has at least one repellant pad having an insect repellant contained therein that is dispersed by heat. At least one metallic plate is in contact with the repellant pad. The metallic plate is heated by a heat source and by contact with the repellant pad heats the insect replant thereby dispersing the insect repellant into the air.

16 Claims, 8 Drawing Sheets

INSECT REPELLANT TORCH

CROSS REFERENCE TO RELATED APPLICATIONS

This application claims the priority of U.S. Provisional Patent Application No. 61/261,121 entitled "INSECT REPELLANT TORCH," filed Nov. 13, 2009, the contents of which are hereby incorporated by reference.

FIELD OF THE INVENTION

This disclosure relates to insect repellant devices in general, and more specifically to insect repellant lamps.

BACKGROUND OF THE INVENTION

Outdoor activities often require some form of insect repellant for comfort and/or safety. Repellants can be worn, but this results in prolonged contact with chemicals that may be hazardous and will generally have to be reapplied. Most worn repellants also give off odors that may be unpleasant. Furthermore, when the outdoor activity is concluded, the wearable repellant remains on the skin even if its efficacy has faded.

In addition to wearable repellants, area-wide repellants such as traditional citronella candles may be utilized. However, the radius of protection of an ordinary candle may vary greatly and result in a large number of candles being needed to provide adequate repellency. Furthermore, with any traditional candle, the degree of volatilization of repellant can be difficult to control. With candles, the volatilization is from within the burned fuel which may limit the amount of repellant that may be dispersed. The kinds of chemicals that may be used may also be limited since the chemical must survive the combustion process.

At least in partial response to the issues with repellant candles, products such as mosquito coils have been developed. However, the repellant of the mosquito coil is in the form of a smoke and the product must continually smolder to be effective. This type of dispersal may generate more toxic byproducts than combustion by candle. Additionally, it can be difficult to extinguish the product safely once it is no longer needed. Thus, once lit, a coil type product must be monitored for up to several hours even if it is not needed for this long.

What is needed is a system that addresses the above, and related, concerns.

SUMMARY OF THE INVENTION

The present invention disclosed and claimed herein, in one aspect thereof, comprises an insect repellant torch. The torch has at least one repellant pad having an insect repellant contained therein that is dispersed by heat. At least one metallic plate is in contact with the repellant pad. The metallic plate is heated by a heat source and, by contact with the repellant pad, heats the insect replant thereby dispersing the insect repellant into the air.

DETAILED DESCRIPTION OF THE PREFERRED EMBODIMENTS

Figure 1:
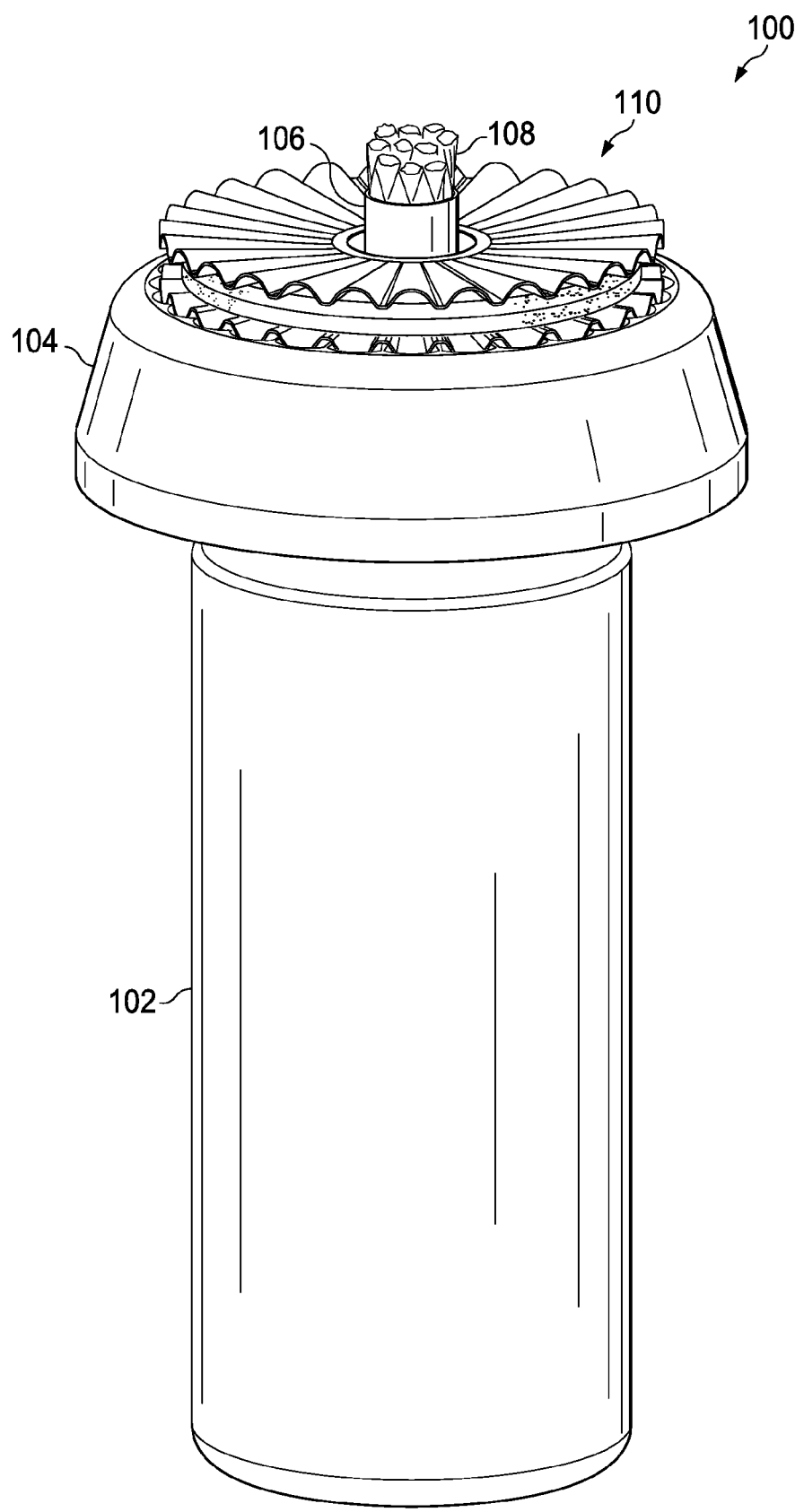
FIG. 1 is a perspective view of an insect repellant torch according to aspects of the present disclosure.

Referring now to FIG. 1, in one embodiment, a lamp assembly 100 of the present disclosure is shown. The lamp assembly 100 is referred to herein as a lamp or torch but these terms are not meant to be limiting. The various embodiments of the present disclosure may be used in a table top or standalone setting, as a primarily utilitarian device, as a part of a decorative device, as a part of path lighting or other lighting, and/or in other contexts. It will be appreciated that the form and functionality described herein may be readily adapted to a number of specific applications.

The lamp assembly 100 is comprised of a liquid fuel canister 102 and a repellant sandwich assembly 110. The repellant sandwich assembly 110 is placed on the liquid fuel canister 102 in such a way that the flame produced by the liquid fuel canister is positioned above the repellant sandwich assembly. In various embodiments, the sandwich assembly 110 is heated by radiant heat absorption, conductive heating, and/or convective heating.

A canister top 104 may be provided for receiving the repellant sandwich assembly 110. The liquid fuel used in the fuel canister 102 is preferably either kerosene or mineral oil. The canister 102 includes a flame tube 106 which extends upwardly from the canister and is sized for receiving and holding the repellant sandwich assembly 110. The flame produced by the fuel canister begins at and projects upwardly from the upper end of the flame tube. A wick 108 may serve as the flame source.

In the present embodiment, it is contemplated that the sandwich assembly 110 will be radiantly heated by flame. However, other radiant heat sources are also contemplated. For example, an electric heat source or incandescent bulb could also be utilized. Additionally, non-flame-producing exothermic chemical reactions may also be used. In some embodiments, heat sources are selected to insure 360 degrees of heating of the repellant sandwich assembly 110.

In addition to radiant heat, some heating of the sandwich assembly may occur via conduction and convection. The flame tube 106 may become heated due to its proximity to the heat source. Some of this thermal energy will be transferred to the canister top 104 and to the sandwich assembly 110. Some heating effect may be seen due to convection, owing to the proximity of the sandwich assembly to the heated gases produced by the flame or other heat source.

Figure 2:
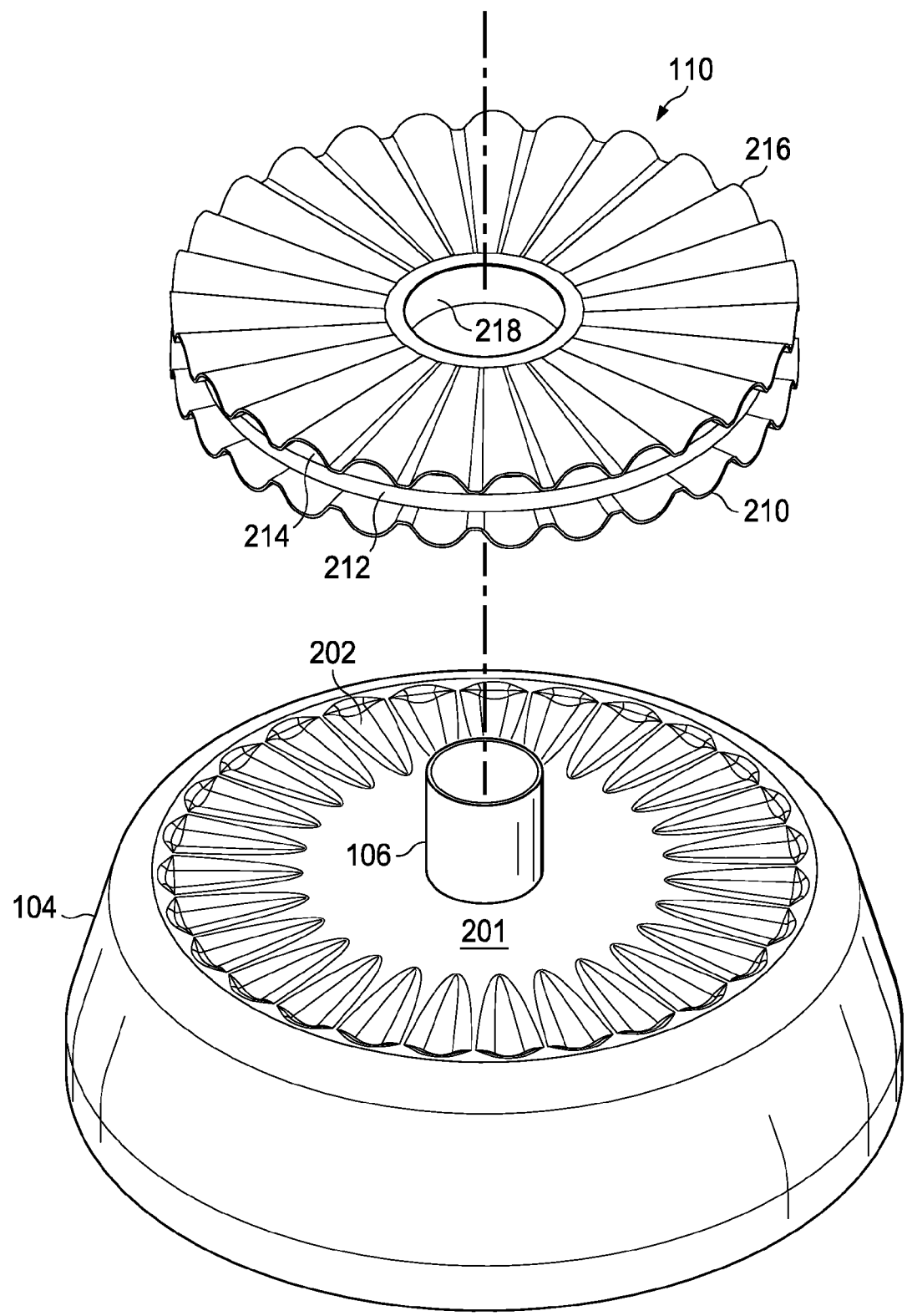
FIG. 2 is a partially exploded view of the top of the torch of FIG. 1.

Referring now to FIG. 2, a partially exploded view of the top of the torch of FIG. 1 is shown. In the present embodiment, the repellant sandwich assembly 110 comprises: a radially extending upper metal plate 216; a radial extending lower metal plate 210 spaced apart from the upper metal plate; an upper lemon grass oil pad 214 positioned beneath and against the bottom side of the upper metal plate; and a lower lemon grass oil pad 212 positioned on top of and against the upper side of the lower metal plate. In some embodiments, a gap also exists between the upper and lower lemon grass oil pads 214, 212.

Although examples are given in the present disclosure where lemon grass oil pads 214, 212 are utilized, it is contemplated that other scents and/or chemicals or combinations may be utilized. For example, a citronella product could be utilized. Other chemical based repellants could be utilized as well. In one embodiment, one pad may provide a chemical repellant and the other pad provide a masking scent. Similarly, although two pads 214, 212 are shown, the present disclosure is not meant to be limited to designs with two pads. A single pad might be used as well as a stack of three or more pads. Spaces between the pads might vary depending upon the chemicals and repellants used and the speed with which it is desired that they be dispersed. In some embodiments, the pads 214, 212 may be of different sizes. The pad configuration may be tailored to take advantage of the properties of the specific heat source and/or repellant being utilized.

In addition to the foregoing, additional customization options for the pads 214, 212 are contemplated. For example, a combination of repellants having different strengths and/or volatility may be utilized on the separate pads 214, 212 on the same torch. A highly volatile repellant may be used to quickly rid the area of pests while a repellant of lower volatility maintains an effective level of repellant in the air over a longer period of time. This effect may also be achieved by using the same repellant but different pad 214, 212 and/or plate 210, 216 configurations as otherwise described herein.

Some ingredients that may be used with the pads 212, 214 may be flammable and/or difficult to effectively volatize in a controlled manner. In light of this, the metal plates 210, 216 may serve multiple purposes. In one aspect, the plates 210, 216 allow the active ingredients of the pads 212, 214 to be volatilized without direct contact with a flame or heat source that could lead to combustion. Additionally, the heat conductive capacity of the plates 210, 216 helps ensure even heating and volatilization. The plates 210, 216 also aid in metering the dispersal of volatiles in such a manner as to be effective without being wasted or exhausted too quickly.

In order to further control volatilization, the plates 210, 216 may be different colors or otherwise applied with different finishes to alter their radiant heating characteristics. For example, the top plate 216 may be finished or coated with lighter or darker colors than the bottom plate 210. It is understood that in addition to the size, shape, and color of the plates 210, 216, their proximity to the heat source will also be a factor. In some embodiments, plates 210, 216 and/or pads 212, 214 may have differing sizes.

A vertical bore 218 is provided through the center of the repellant sandwich assembly 110 and sized such that, when the repellant sandwich assembly is placed on the top 104 of fuel canister 102, the canister flame tube 106 extends upwardly through the central bore of the assembly. In addition, in some embodiments, the vertical thickness of the repellant sandwich assembly 110, as compared to the length of the canister flame tube 106, is such that the upper metal plate 216 of the sandwich assembly is positioned below or substantially even with the upper end of the canister flame tube. Consequently, as mentioned above, the flame emanating from the upper end of the canister flame tube is positioned above the upper plate of the repellant sandwich assembly 110.

It can also be seen that, in the present embodiment, the canister top 104 may have an upper surface 201 upon which the repellant sandwich assembly 110 rests. The upper surface 201 may also provide recesses 202 with a shape complimentary to the lower metal plate 210 of the repellant sandwich assembly 110. This may serve to stabilize the repellant sandwich assembly in the proper location against the upper surface 201 and keep the central bore 218 centered around the flame tube 106. Additional conductive heat transfer of the repellant sandwich assembly 110 may occur from the heating of the top 104.

The heat energy (radiant and/or conductive) absorbed from the canister flame by the plates 216, 210 of the sandwich assembly 110 operates to volatilize the repellant agent contained in at least the upper lemon grass oil pad 214, thereby releasing the volatilized repellant to the atmosphere. In order to control the rate of heat absorption by the upper plate 216 and to thereby control the rate at which the repellant material in the oil pad(s) is volatilized and released to the atmosphere, the metal plate 216 can be polished to provide reflective properties which slow the rate of heat absorption, or painted black to increase the rate of heat absorption and thereby increase the rate of repellant volatilization. In addition, the upper and lower plates 216, 210 can have different polished or painted finishes such that, by turning the repellant sandwich 110 over, the user can selectively choose either a slow rate of release or a rapid rate of release to the atmosphere.

Although the figures show a circular design for the repellant sandwich assembly, other shapes could alternatively be used for aesthetic or functional reasons. In additional, although a radial wave pattern is shown for providing spacing and reducing the contact area between the metal plates 216, 210 and the oil pads 214, 212, other forms may be used such as triangular or square shapes or combinations of these or others. The fluting or shape of the metal plates 216, 210 also allows a finer degree of control over the rate of volatilization of the repellant. The shape of the plates 216, 210 determines in part how much air circulation reaches the pads and the degree of heating of the pads 214, 212.

In some embodiments, the shape of the metal plate may differ from one side of the repellant sandwich 210 to the other. This may provide for different heating effects based on the side of the sandwich 210 facing the heat source. One or both of the metal plates 216, 210 could also be perforated or otherwise opened in certain locations to control the volatilization process more precisely.

In determining the proper dimensions and constructions for the devices shown in various embodiments of the present disclosure, it should be noted that in many cases, the volatile ingredients used in the pads 214, 212 are flammable. Thus, care should be taken that these ingredients are not set ablaze. Although ignition of the volatiles is not necessarily dangerous, it may tend to reduce the effectiveness in terms of scent, insect repellency, and/or other measures. Nevertheless, the ingredients must be sufficiently heated so as to disperse into the atmosphere in order to be effective.

To simply control the distance of the pads from the heat source may not be sufficient to achieve volatilization without ignition. It may also be inadequate to simply provide a metallic cover over the pad to shield it from some of the radiant heat, as a flat shield may slow the flow or exchange of air around the pad to such a degree that volatilization slows to an unacceptable level. However, the embodiments presented in the present disclosure do achieve a sufficient degree of volatilization without ignition. The fluted shape of the metallic plates 216, 210 allows for a degree of air exchange, but does not allow sufficient oxygen to the pads 214, 212 to allow combustion. The relatively high heat will still allow effective volatilization though.

It should be noted that if the flutes or waves of the metallic plates 216, 210 are too large, enough oxygen may circulate near the pads to allow combustion. Conversely, if the plates 216, 210 are too flat, not enough volatilization will occur for the repellant or other chemical to be effective. Even with appropriately contoured or fluted plates, some of the volatiles may be consumed near the heat source or flame. However, due to the plates' 216, 210 position over the pads 214, 212, this will generally occur at an area that is not in relatively close proximity to the pads. Thus, the chance of flare up is minimized.

Figure 3:
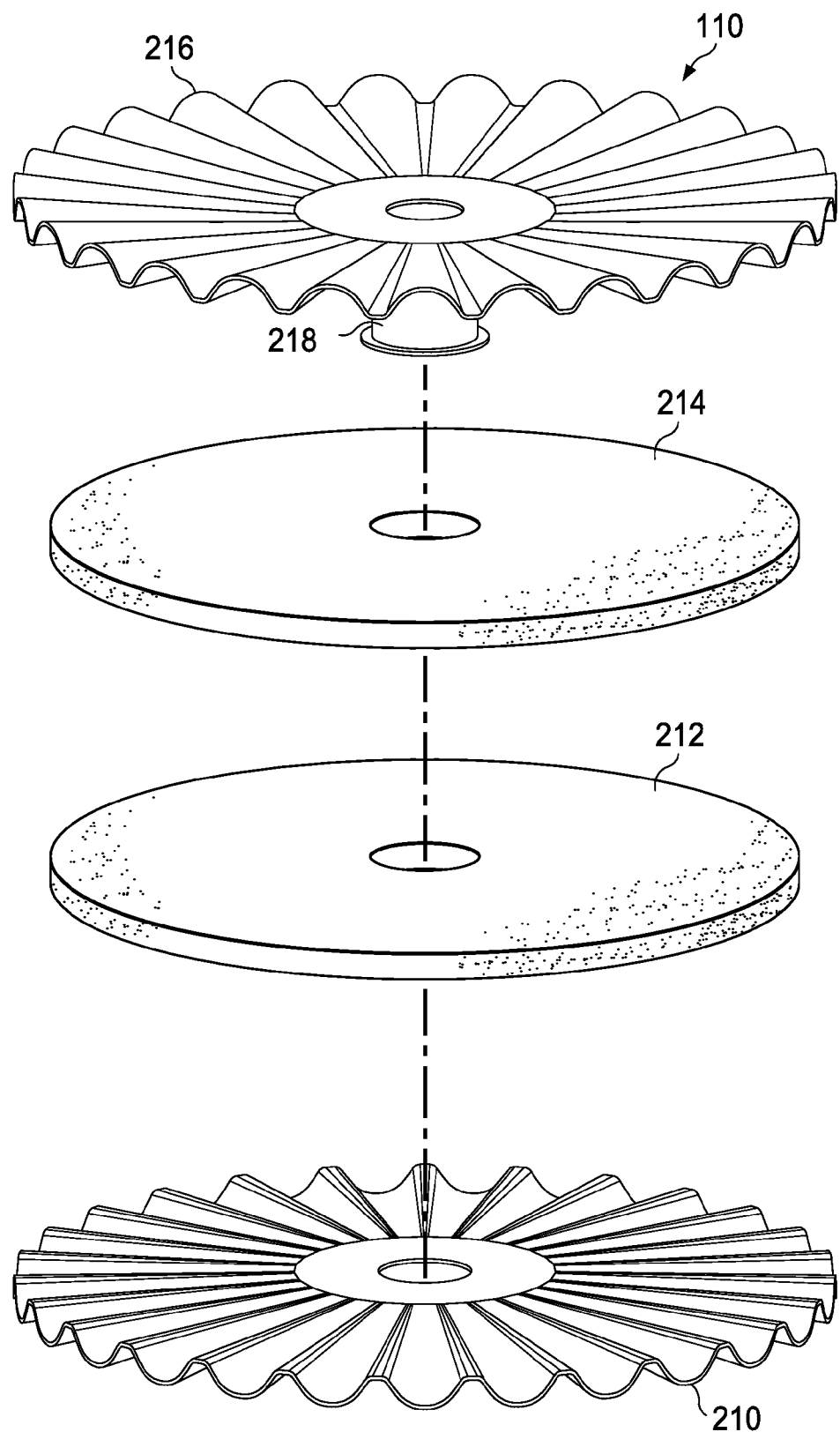
FIG. 3 is an exploded view of the repellant sandwich assembly of FIG. 1.
Figure 4:
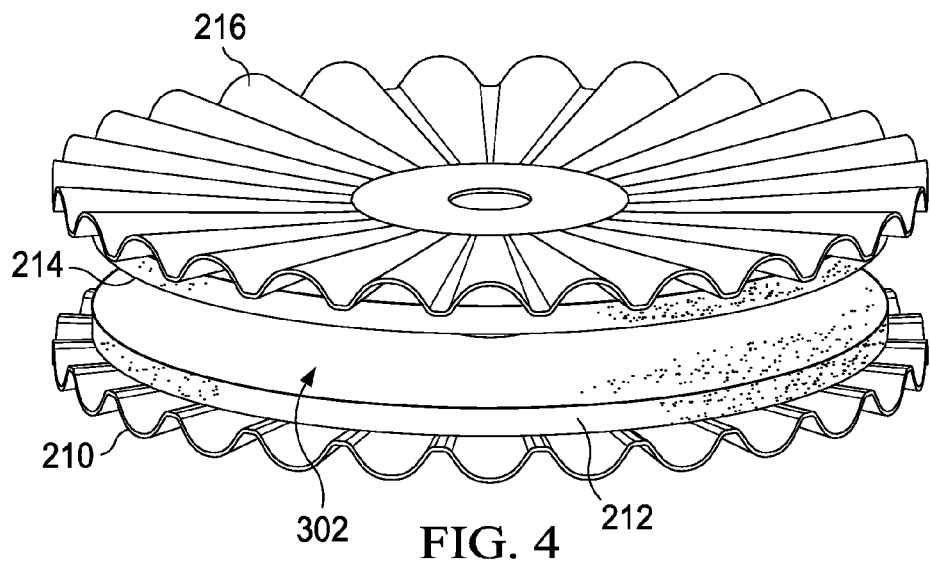
FIG. 4 is a perspective view of another sandwich assembly according to aspects of the present disclosure.

Referring now to FIG. 3, an exploded view of the repellant sandwich assembly of FIG. 1 is shown. Here, the lower metal plate 210 can be seen adjacent to the lower scent pad 212. The upper scent pad 214 can be seen adjacent to the upper metal plate 216. The central bore 218 can also be seen from this view. When assembled, the central bore 218 will pass through both metal plates 210, 216, and both scent pads 212, 214. The dimensions shown in FIG. 3 and the other drawings are exemplary only. It will be appreciated that many different sizes of the devices of the present disclosure can be made depending upon the needs of the end user. Referring now to FIG. 4, a perspective view of the assembled sandwich assembly can be seen. Here, the gap between the scent pads 212, 214 may also be seen.

Figure 5:
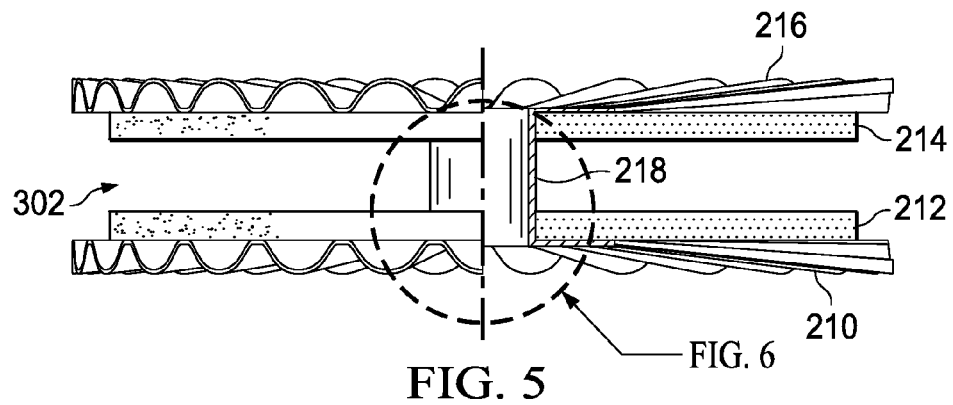
FIG. 5 is a side view with partial cutaway of the sandwich assembly of FIG. 4.
Figure 6:
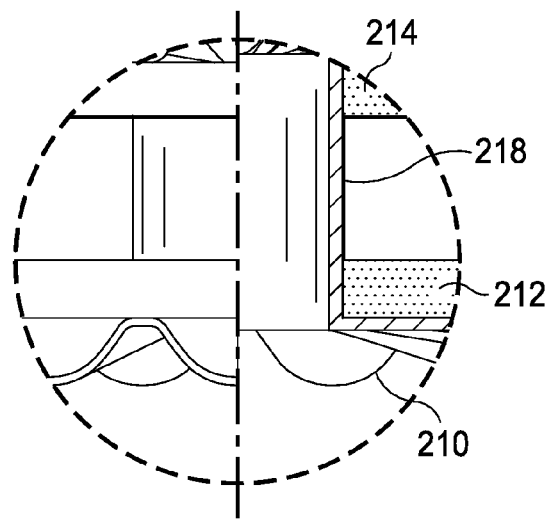
FIG. 6 is a magnified view of the portion of FIG. 5 denoted 'A'.

FIG. 5 is a side view with a partial cutaway of the assembled sandwich assembly further illustrating the gap 302 and the position and placement of the other components of the sandwich assembly 110. FIG. 6 is a magnified view of the portion of FIG. 5 denoted A. Here, the detail of the placement of the central bore 218 relative to the other components can be seen in greater detail.

It is understood that in the various embodiments described herein, the curvature or spacing of the fluting of the 216, 210 may be adjusted to increase or decrease the amount of contact the metal plate has with the repellant pad or pads. In this way, the rate of volatilization of the repellant chemical or chemicals may be controlled. This is in addition to the previously discussed methods, including polishing and/or painting of the plates.

Figure 7:
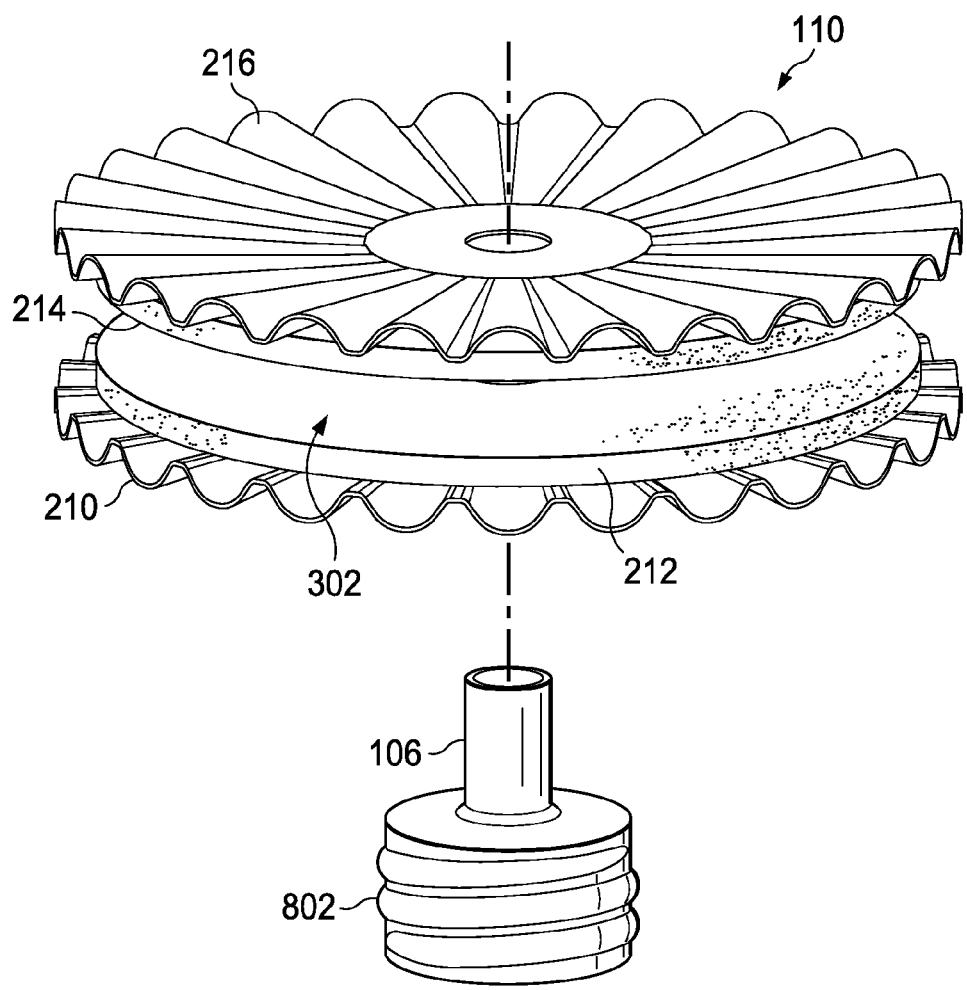
FIG. 7 is a partially exploded perspective view of another top of an insect repellant torch according to aspects of the present disclosure.
Figure 8:
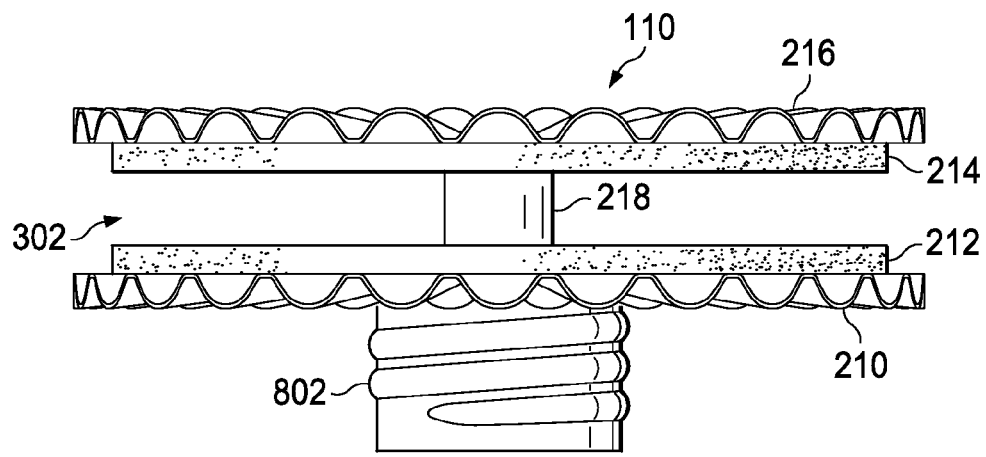
FIG. 8 is a side view of the top shown in FIG. 8.

Referring now to FIG. 7, a partially exploded perspective view of another top of an insect repellant torch according to aspects of the present disclosure is shown. In the embodiment of FIG. 7, a different canister top 802 is used that interfits with the repellant sandwich assembly 110. FIG. 8 illustrates the repellant sandwich assembly 110 resting on the canister top 802. Here again, the gap 302 between the repellant pads 212, 214 can be seen. Once again, the plain tube 106 passes through the central bore 218 of the repellant assembly 110.

Figure 9:
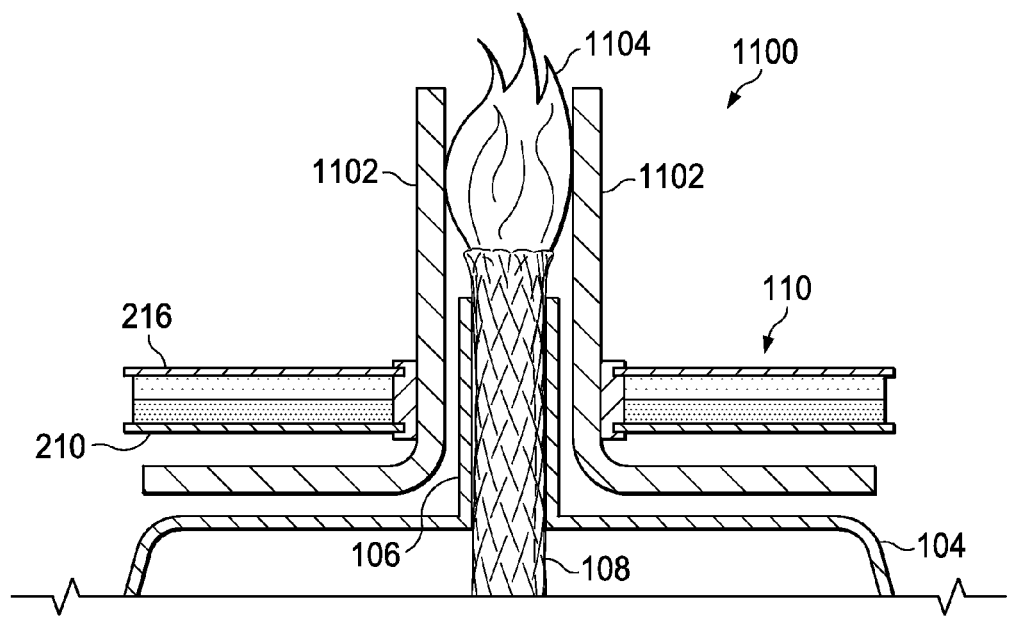
FIG. 9 is a side cutaway view of the top of an embodiment of a insect repellant torch having additional heat conductive tubes.

Referring now to FIG. 9, a side cutaway view of the top of another embodiment of a insect repellant torch 1100 is shown. The torch 1100 is similar to those previously described but also provides a plurality of heating tubes 1102 that aid in conductive heating of the pad assembly 110. In the present embodiment, the heating tubes 1102 are in close proximity to, or in contact with, the heat source. In this case, the heat source is a flame 1104, but as in other embodiments, other heat sources are contemplated. The heating tubes 1102 allow for a increased amount of conductive heat to reach the sandwich assembly 110 relative to the amount of radiant heat absorbed by the sandwich assembly 110. This in turn may allow for additional control over volatilization rates.

Figure 10:
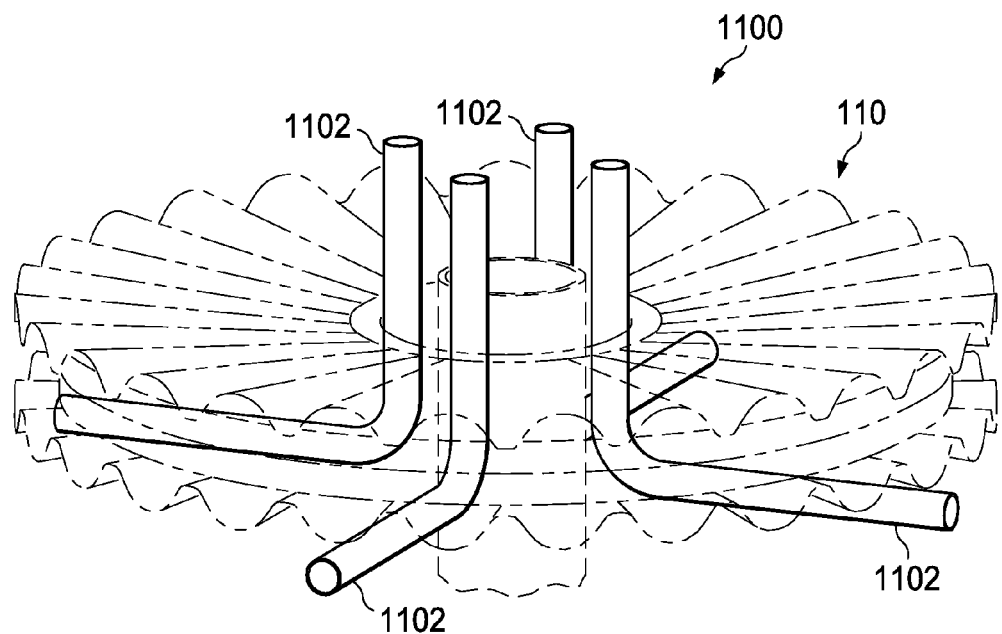
FIG. 10 is a perspective view of the torch of FIG. 11 showing the pad assembly in ghost image.

The torch 1100 is shown in perspective in FIG. 10 with the repellant sandwich assembly 110 shown in ghost outline. Here it can be seen that four heating tubes 1102 are used in the present embodiment. However, more or fewer may be used depending upon the heating rate needed and other factors. The heating tubes 1102 may be made from a heat resistant metal and may have finishes or coloration applied to alter the amount of heat absorbed from the flame 1102. The tubes 1102 may vary in length and each tube may be of a different length if such fine control over heating is needed.

Figure 11:
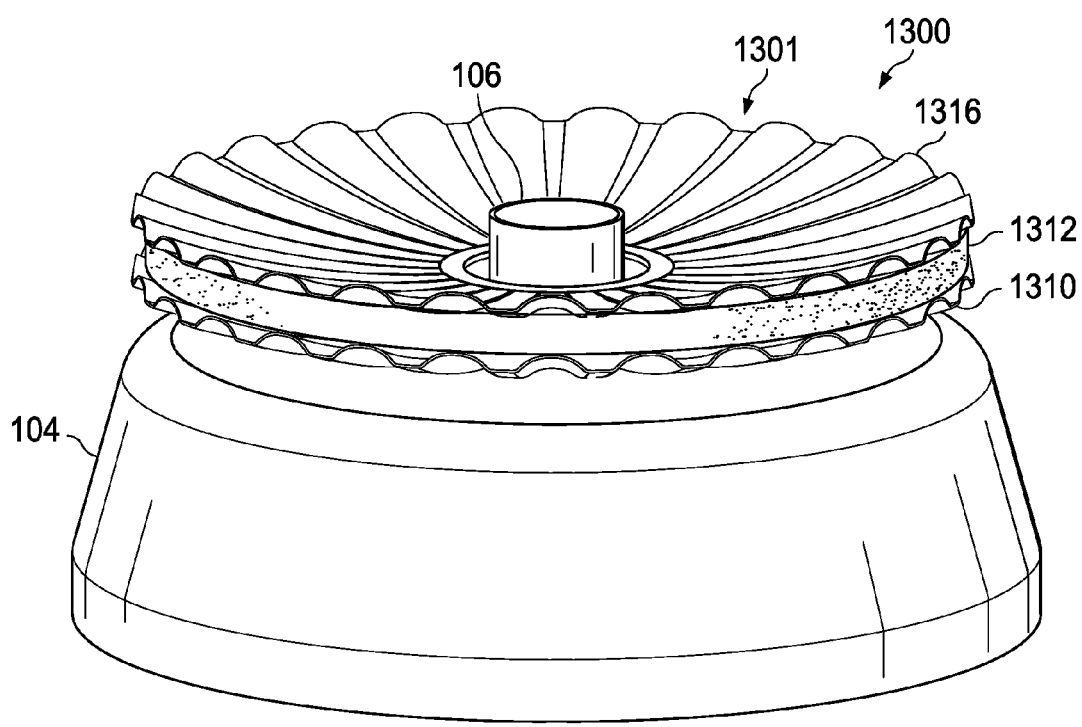
FIG. 11 is a perspective view of another embodiment of a top of an insect repellant torch according to aspects of the present disclosure.

Referring now to FIG. 11 is a perspective view of another embodiment of a top of an insect repellant torch according to aspects of the present disclosure. The top 1300 is similar to that shown in FIG. 1 in that a repellant sandwich assembly 1301 is provided that will sit below the flame to be heated by radiation, conduction, and/or convection. The sandwich assembly 1301 comprises subcomponents including a lower plate 1310, and upper plate 1316, and an oil or repellant pad 1312.

The upper and lower plates 1316, 1310 have a generally concave profile in order to more evenly absorb radiant energy from a flame. This concavity is, in turn, imparted to the pad 1312. It can also be seen that the plates 1316, 1310 retain the fluting of the previous embodiments. It will be appreciated that the profile of the plates 1312 may be altered in the number and depth of flutes. Metals and finishes used may also be tailored to create the desired heating of the pad 1312.

Figure 12:
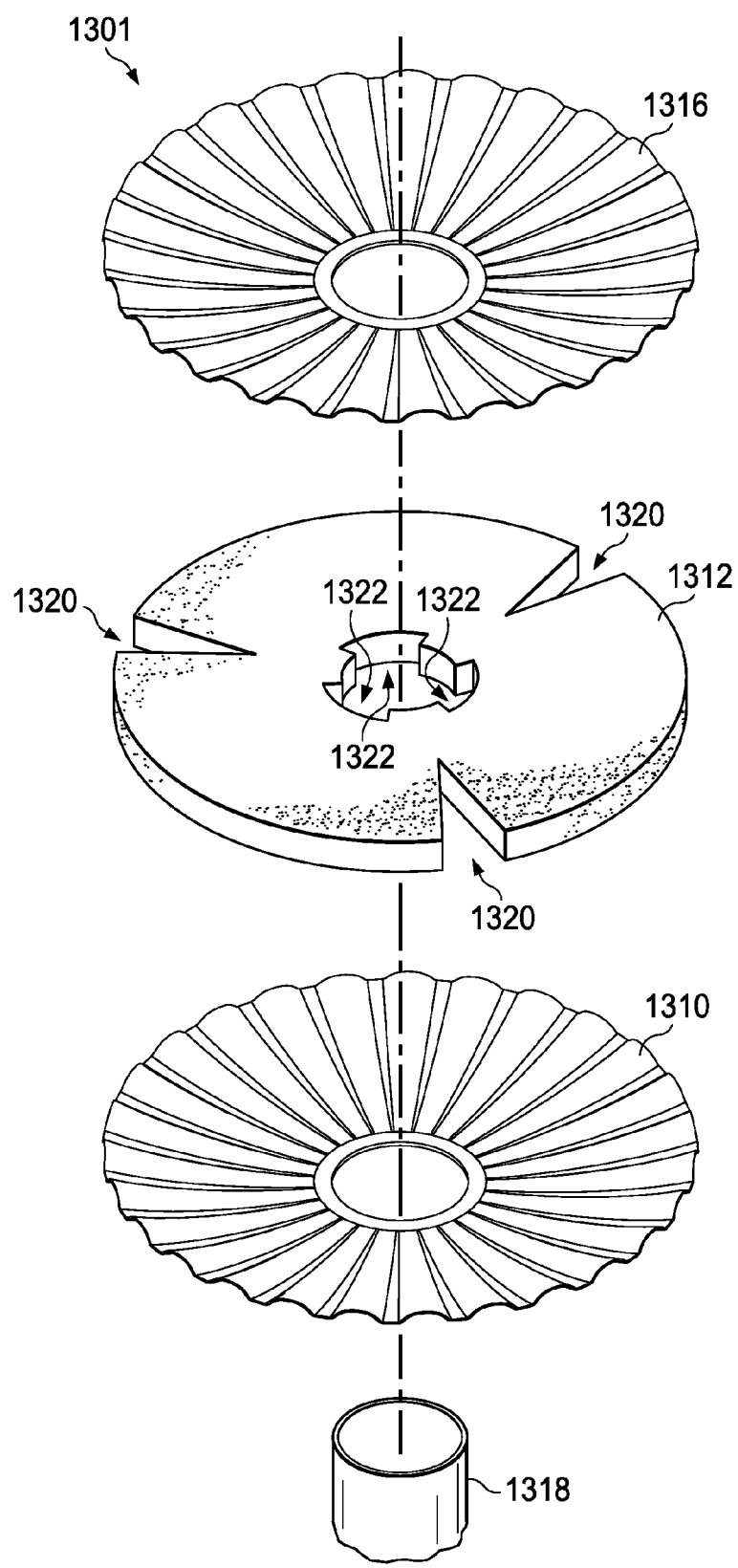
FIG. 12 is an exploded view of part of the top of FIG. 11.

FIG. 12 is an exploded view of part of the top of FIG. 11. Here the lower plate 1310 and upper plate 1316 are parted to reveal the pad 1312. In some embodiments, a rivet or post 1318 may be provided hold the entire assembly 1301 together and to guide the placement of the assembly 1301 onto the flame tube 106.

Figure 13:
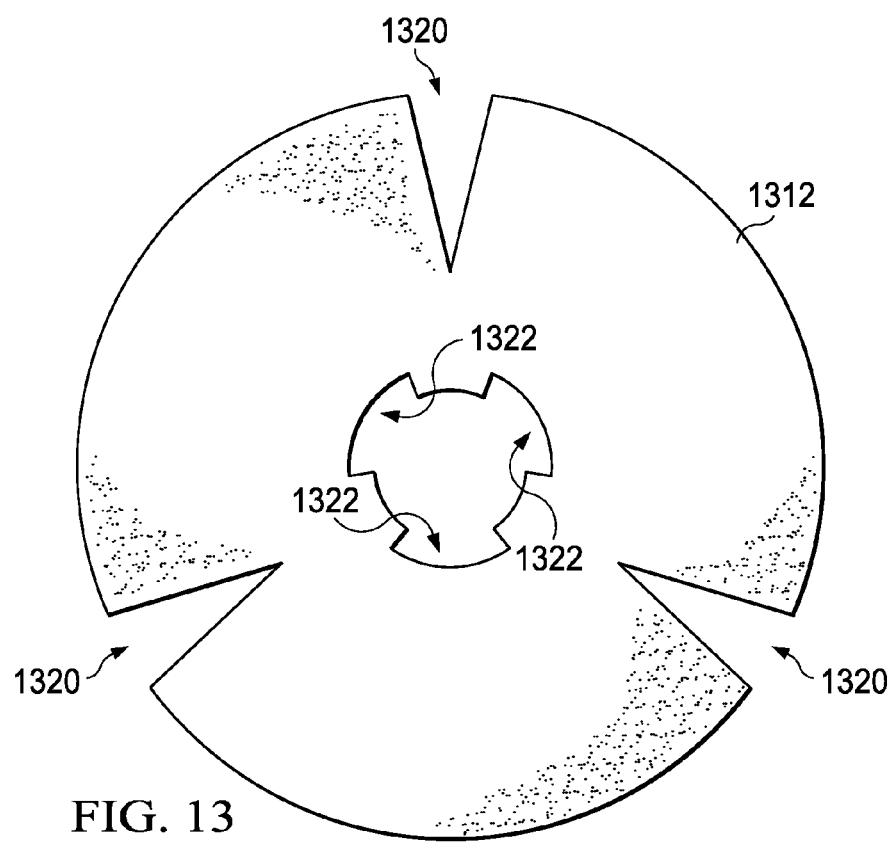
FIG. 13 is a superior view of an insect repellant pad for use with the torch top of FIG. 11.

FIG. 13 is a superior view of an insect repellant pad for use with the torch top of FIG. 11. In the present embodiment, an outer periphery of the generally toroidal shaped pad 1312 defines recesses or cutouts 1320 to increase exposure of the pad 1312 to atmosphere to increase volatilization of repellants. In the present embodiment the cutouts 1320 are wedge shaped but the present disclosure is not meant to be so limited.

An inner periphery of the pad 1312 may also provide cutouts 1322. These may be useful in controlling the amount of heat absorbed conductively from the wick tube 106 and rivet 1318, both of which will be in close proximity to flame. Once again, the shape of the cutouts may be chosen based on ease of manufacture or other consideration.

It is understood that even though the pad 1312 is described with respect the embodiments of FIGS. 11-13, it may also be utilized with other embodiments described herein. Similarly, previously described repellant pads (i.e., those without cutouts) may also be used with the concave plates 1310, 1316.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. An insect repellant torch comprising:
   at least one repellant pad having an insect repellant contained therein that is dispersed by heat; and
   at least one metallic plate in contact with the repellant pad;

wherein the metallic plate is heated by a heat source and by contact with the repellant pad heats the insect repellant thereby dispersing the insect repellant into the air;
a canister for fuel;
a wick for burning the fuel as the heat source; and
a wick tube holding the wick and passing through the repellant pad and the plate.

2. The insect repellant torch of claim 1, wherein the at least one metallic plate is fluted to control heating of the repellant pad.

3. The insect repellant torch of claim 1, wherein the pad defines a plurality of cutouts for controlling dispersal rate of the repellant.

4. The insect repellant torch of claim 1, wherein the at least one metallic plate comprises and upper and a lower plate in contact with the repellant pad.

5. The insect repellant torch of claim 1, wherein the insect repellant comprises lemon grass oil.

6. An insect repellant torch comprising:
a fuel canister with a canister top attached thereto, the top providing a flame tube;
an upper and a lower metallic plate connected via a central bore, the central bore surrounding the flame tube; and
upper and lower repellant pads in contact with the upper and lower metallic plates, respectively, the upper and lower repellant pads having a space therebetween and surrounding the central bore;
wherein the upper metallic plate is heated by radiant heat from atop the flame tube, the heated metallic plate heating at least the upper repellant pad by contact and thereby dispersing repellant into the atmosphere.

7. The insect repellant torch of claim 6, wherein the upper and lower metallic plates are fluted.

8. The insect repellant torch of claim 6, wherein the upper and lower metallic plates and the upper and lower repellant pads are circular when viewed from above.

9. The insect repellant torch of claim 6, wherein the upper and lower pads have different concentrations of repellant therein and the dispersal of repellant can be controlled by flipping the upper and lower metallic plates.

10. The insect repellant torch of claim 6, further comprising at least one heating tube extending from proximate the flame tube to contact with the lower metallic plate.

11. An insect repellant torch comprising:
a fuel canister with a canister top attached thereto, the top providing a flame tube;
an upper and a lower concave metallic plate connected via a central bore, the central bore surrounding the flame tube; and
an absorbent pad containing an insect repellant, disposed around the central bore, and in contact with the upper and lower metallic plates;
wherein the upper metallic plate is heated by radiant heat from atop the flame tube, the heated metallic plate heating the upper repellant pad by contact and thereby dispersing repellant into the atmosphere.

12. The insect repellant torch of claim 11, wherein the upper and lower metallic plates are fluted.

13. The insect repellant torch of claim 11, wherein the absorbent pad contains lemon grass oil.

14. The insect repellant torch of claim 11, wherein the absorbent pad is generally toroidal in shape and provides a plurality of cutouts around an outer periphery thereof.

15. The insect repellant torch of claim 11, wherein the absorbent pad is generally toroidal in shape and provides a plurality of cutouts around an inner periphery thereof.

16. The insect repellant torch of claim 11, wherein the metallic plates have a dark coating to increase absorption of radiant energy.

* * * * *